UNITED STATES PATENT OFFICE.

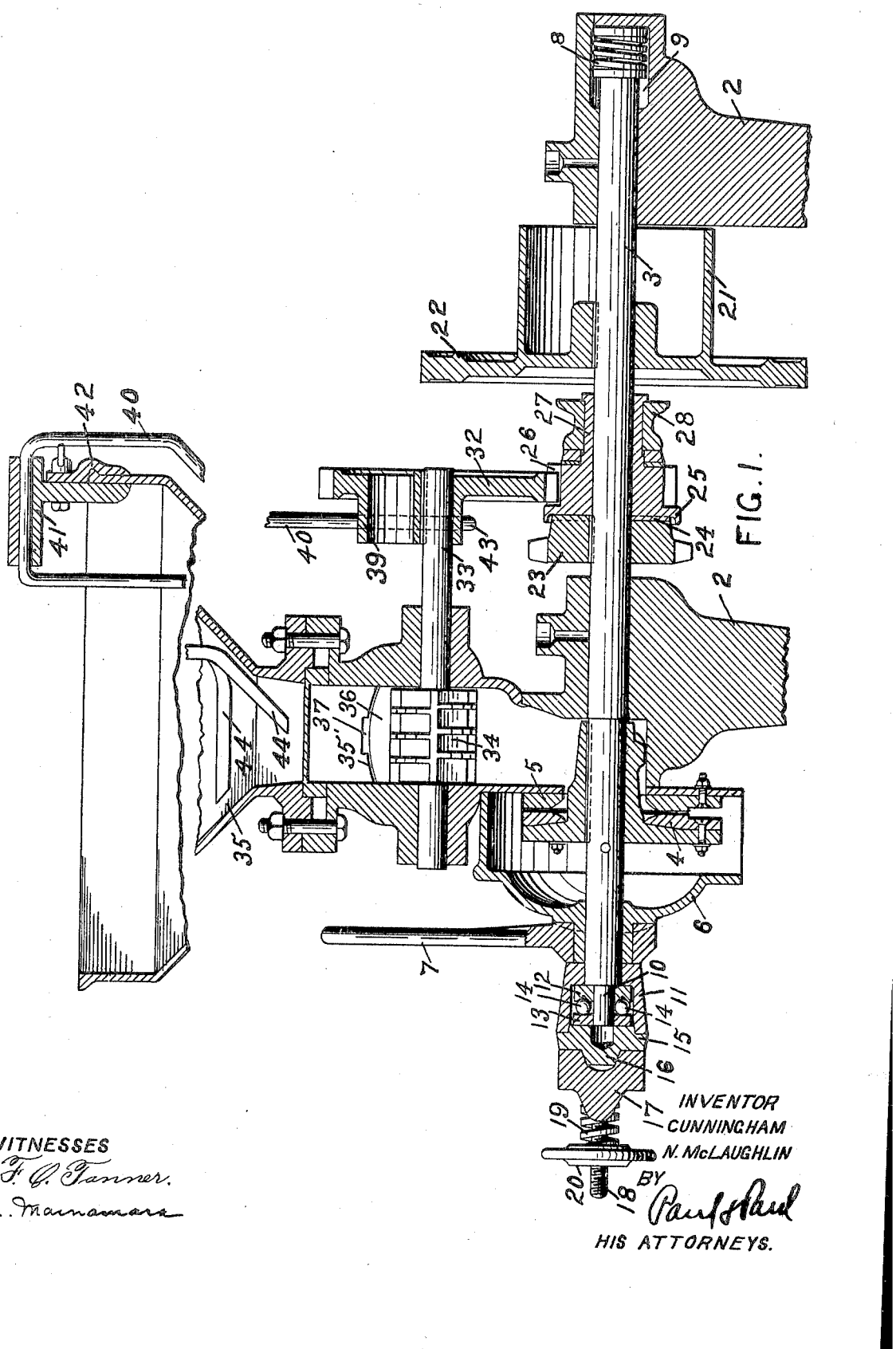

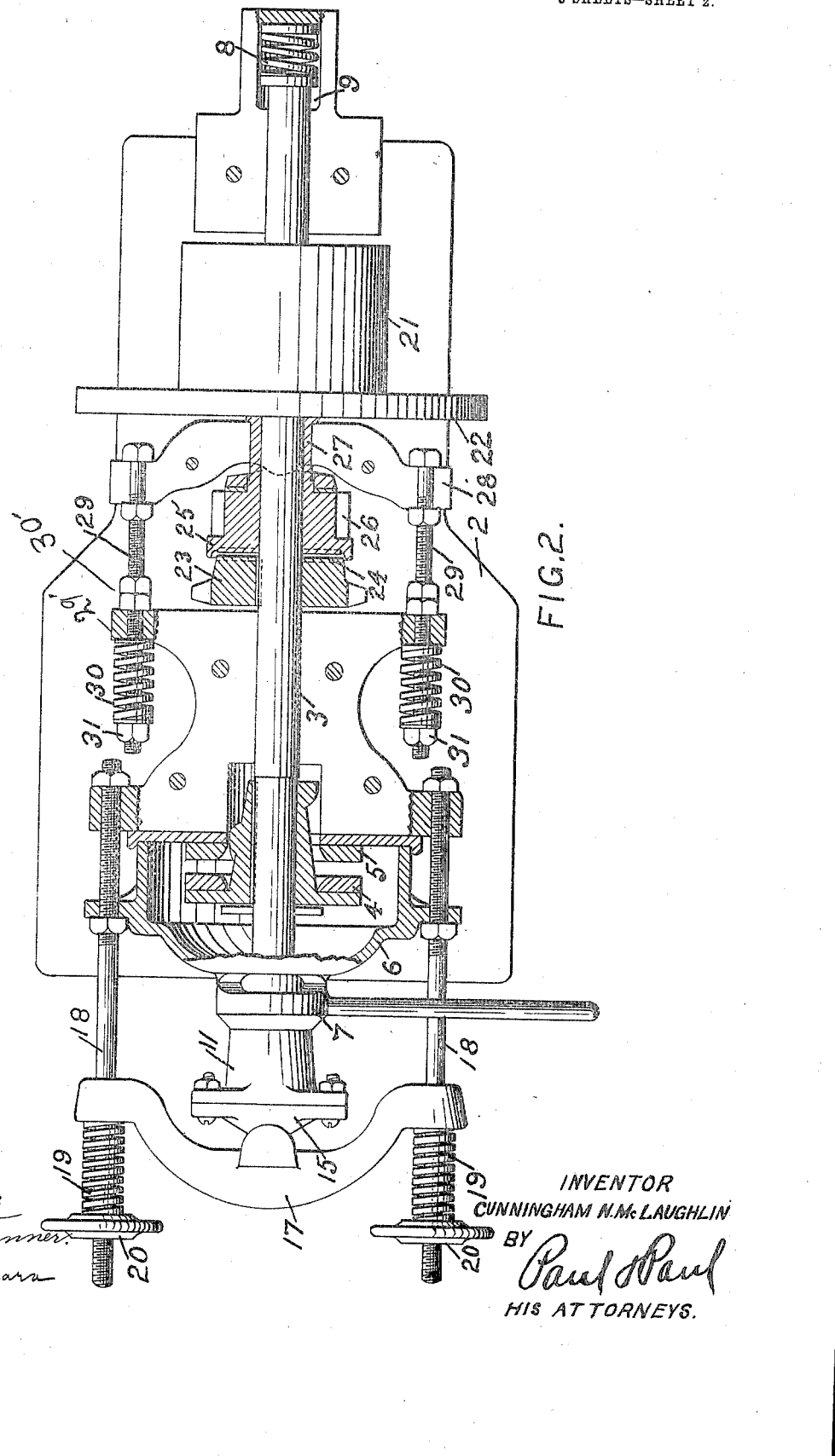

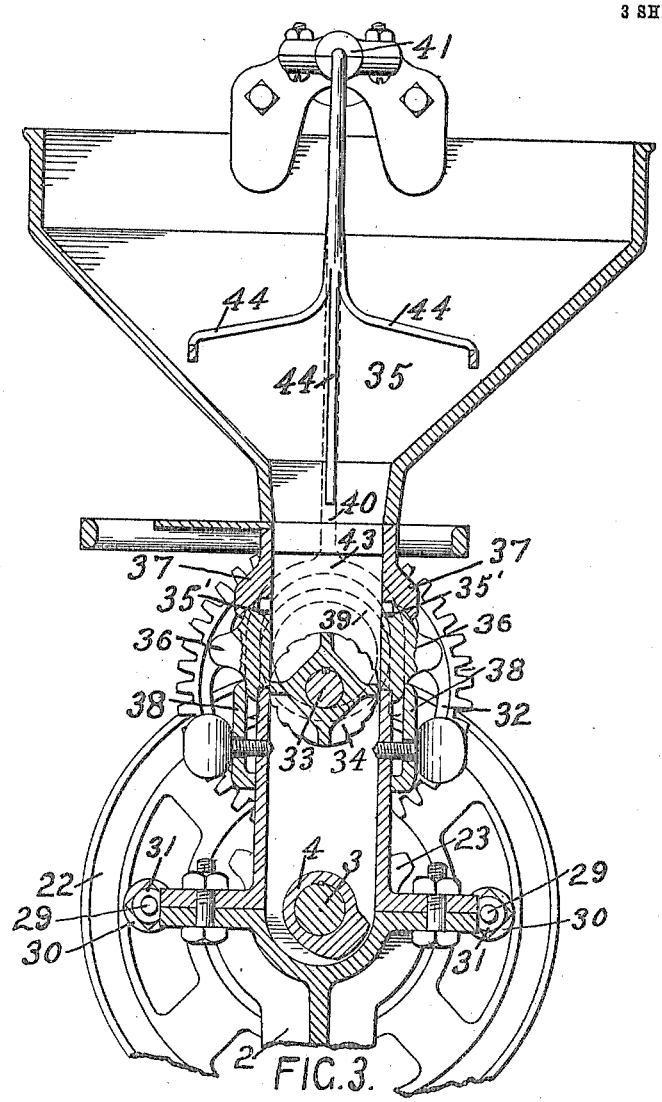
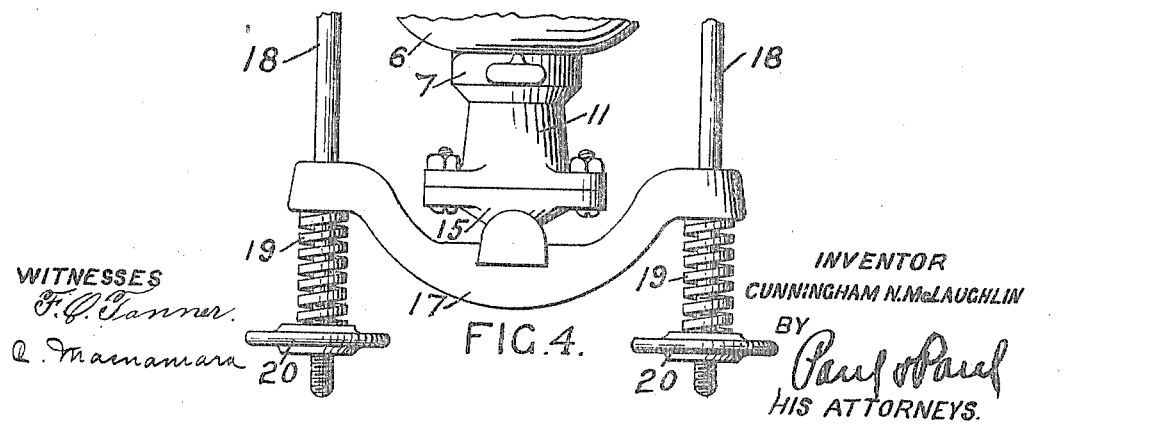

CUNNINGHAM N. McLAUGHLIN, OF WINONA, MINNESOTA, ASSIGNOR TO NEW WINONA MANUFACTURING CO., OF WINONA, MINNESOTA, A CORPORATION OF MINNESOTA.

GRINDING-MILL.

No. 811,945.  Specification of Letters Patent.  Patented Feb. 6, 1906.

Application filed March 6, 1905. Serial No. 248,405.

*To all whom it may concern:*

Be it known that I, CUNNINGHAM N. McLAUGHLIN, of Winona, Winona county, Minnesota, have invented certain new and useful Improvements in Grinding-Mills, of which the following is a specification.

My invention relates to mills for grinding grain of all kinds, drugs, and spices; and the object of the invention is to improve the mill used for a similar purpose shown and described in Letters Patent of the United States, issued to me September 1, 1903, No. 737,953.

The invention consists generally in providing means for checking the feed simultaneously with the separation of the grinding-burs.

Further, the invention consists in providing a ball-bearing to receive the thrust of the bur-shaft.

Further, the invention consists in providing an agitating device in connection with the hopper to prevent the material from clogging therein.

Further, the invention consists in various constructions and combinations, all as hereinafter described, and particularly pointed out in the claims.

In the accompanying drawings, forming part of this specification, Figure 1 is a vertical longitudinal section of a grinding-mill embodying my invention. Fig. 2 is a longitudinal horizontal section of the same. Fig. 3 is a transverse vertical section. Fig. 4 is a plan view showing in full lines the cage or housing for the ball-bearing at the end of the bur-shaft and the spring-pressed yoke having a rocker bearing thereon.

In the drawings, 2 represents the frame of the mill, and 3 a horizontal shaft having bearings therein and carrying the movable bur 4, arranged to coöperate with a fixed bur 5 and between which the material to be ground is fed, as described in my patent above referred to. A housing 6 is provided for the bur, and a cam-lever 7 is arranged when operated to separate the burs in the manner described in my former patent. A coil-spring 8 is provided within a box 9 at one end of the shaft 3, and its tension is exerted to hold the grinding-burs apart. The shaft 3 is provided at the end opposite from the spring 8 with a reduced extension 10, that is inserted into a cup-shaped housing or cage 11, wherein a ball-bearing consisting of disks 12 and 13 and a series of balls 14 is arranged, the disks having holes to receive the extension 10 and being held in place thereon by a cap-plate 15, that covers the open end of the cage and is provided with a central boss 16. A yoke 17 has a socket to receive the boss 16, and the ends of said yoke are slidably supported on rods 18, that are adjustably mounted in the frame of the mill and provided with coil-springs 19 between the ends of the yoke and hand-wheels 20, by means of which the normal tension of the springs can be increased or diminished. This yoke and its supporting-rods and compression-springs are all shown and described in my former patent, the novel feature of the mechanism consisting of the ball-bearing at one end of the shaft 3 to receive the thrust thereof and greatly reduce the friction at that point and the coil-spring at the other end of the shaft. When the lever 7 is moved to allow the spring 8 to separate the burs, the cage or box for the ball-bearings will be pressed outwardly and the spring 19 put under compression to return the shaft and bur to their normal position and compress the spring 8 when the lever is again set for running. A driving-pulley 21, having a fly-wheel 22, is secured on the shaft 3, and a clutch-member 23, having a series of sprocket-teeth 24, (for a chain not shown,) is also secured on said shaft in position to be engaged by a movable clutch member 25, having gear-teeth 26 and a sleeve 27, upon which a yoke 28 is loosely mounted. Rods 29 have their ends mounted in said yoke and are slidably supported in guides 29' on the machine-frame and provided with coil-springs 30, that bear upon said guides at one end and at the other end upon adjusting-nuts 31 on said rods. Nuts 30' are provided on the rods 29 on the opposite side of the guides 29' from the springs 30. These nuts 30' are held snugly against guides 29' by the tension of the springs 30. The teeth on the clutch-gear 23 enables the operator to drive some other mechanism, as an elevator, from the shaft of the mill. The tension of the springs 30 can be increased or diminished by adjusting the nuts 31 and normally tends to press the yoke 28 and the movable clutch member against the fixed clutch member, and when the operating-lever is moved and the burs separated the fixed clutch member and the shaft will move away from the other member and allow the gear 26 to become stationary. A gear 32, secured on a feed-shaft 33, carries a feed device 34, through which the material passes down to the burs from the hopper 35 above. The feed device 34 is substantially the same as the one described in my former patent and needs no detailed description herein.

Whenever the burs are separated and the clutch members disengaged, the gear 26, engaging the gear 32, will cease running, and the feed will be stopped until the shaft and bur are returned to their normal grinding position. The operator is thus able to simultaneously separate the burs and stop grinding, as when a nail, pebble, or other foreign article passes between the burs, and at the same time stop the feed and arrest passage of material to the burs until they are again returned to their grinding position.

Openings 35' are provided in the wall inclosing the feed device, normally covered by removable plates 36, which upon being removed allow access to the feed device to examine the same or remove nails or any foreign material that may have lodged therein. These plates are preferably held in position by lugs 37 and clamp devices 38.

It sometimes happens in a mill of this kind that the material to be ground will be of such condition or consistency that it will bridge over the opening in the bottom of the hopper and entirely stop the feed therefrom, making it necessary for the operator to almost constantly watch the material in the hopper to insure the free feed of the same. To obviate this difficulty, I provide an eccentric 39 on the gear 32 and mount a rod 40 in a bearing 41, secured by a clamp 42 on the hopper-wall. One end of the rod has a fork 43, that straddles the eccentric, whereby an oscillating movement is imparted to the rod. The opposite end of said rod depends within the hopper and is provided with a series of fingers 44, that project across the discharge-opening in the hopper and cause sufficient agitation of the material in the hopper to effectually prevent it from lodging or clogging therein. These agitating-fingers will be operated continuously with the revolution of the feed device and will stop whenever the feed ceases.

In the operation of the mill power is transmitted through the driving-pulley 21 to the shaft 3, and the feed device having been set in motion the material is fed down to the grinding-burs. Should any foreign material pass into the burs, or should it be desirable to separate them for any purpose, the operator will grasp the lever 7 and by means of the cam-surfaces in connection therewith will move the bur-shaft lengthwise and draw the movable bur away from the fixed one. The fixed clutch member connecting the drive-shaft with the feed device will be moved away from the movable member thereon, and the feed will stop and the agitation of the fingers in the hopper will also cease. When the lever 7 is moved to put the springs 19 under tension, the power of the spring 8 will move the shaft 3 lengthwise, separate the burs, and disengage the clutch. Upon returning the operating-lever to its normal position the tension of the springs 19 will overcome the spring 8 and set the burs in their grinding position and lock the clutch members together to start the feed.

I claim as my invention—

1. In a grinding-mill, the combination, with a fixed bur, of a longitudinally-movable shaft, a bur provided thereon and normally in coöperation with said fixed bur, a spring provided at one end of said shaft and normally tending to move said shaft lengthwise and separate said burs, a ball-bearing provided at the opposite end of said shaft to receive the thrust thereof, a housing or cage for said bearing, a yoke having a rocker bearing on said cage, springs connected with said yoke and arranged to overcome the tension of said first-named spring and hold said burs in grinding engagement with one another, and mechanism for relieving the pressure of said springs on said shaft to allow said first-named spring to move it lengthwise and separate said burs, substantially as described.

2. In a grinding-mill, the combination, with a fixed bur, of a longitudinally-movable shaft, a bur provided thereon and normally in coöperation with said fixed bur, a spring normally tending to move said shaft lengthwise and separate said burs, a ball-bearing provided at one end of said shaft to receive the endwise thrust thereof, a housing or cage for said bearing, a yoke having a central bearing on said cage, springs connected with ends of said yoke on each side of said bearing and arranged to overcome the tension of said first-named spring to hold said burs in grinding engagement with one another, and mechanism for relieving the pressure of said yoke-springs on said shaft to allow said first-named spring to move it lengthwise and separate said burs.

3. In a grinding-mill, the combination, with a frame and a fixed bur mounted therein, of a longitudinally-movable shaft, a bur mounted on said shaft and movable therewith, a cage provided at one end of said shaft and comprising a cup 11 having an opening to receive the end of said shaft, and a plate 15 covering the open end of said cup and provided with a boss 16, a ball-bearing provided within said cup and adapted to receive the endwise thrust of said shaft, a spring-pressed yoke engaging said boss and normally tending to hold said burs together, and mechanism for relieving the pressure of said yoke on said boss and shaft to allow said burs to separate, substantially as described.

4. In a grinding-mill, the combination, with a frame and a hopper provided with a feed mechanism, of a fixed bur, a longitudinally-movable shaft, a bur mounted on said shaft and arranged to coöperate with said fixed bur, mechanism for moving said shaft lengthwise to separate said burs, a clutch-gear 23 secured on said shaft, a clutch member 25 arranged to move lengthwise on said shaft and engage said clutch-gear and having gear-teeth 26 in operative connection with said feed mechanism, a yoke 28 having rods 29 adjustably secured with said frame, and springs 30 provided on said rods 29, substantially as described.

5. In a grinding-mill, the combination, with a frame and a hopper provided with a revolving feed mechanism, of a fixed bur, a longitudinally-movable shaft, a bur mounted thereon and arranged to coöperate with said fixed bur, a clutch mounted on said shaft and comprising a fixed and a movable member, said movable member having gear-teeth operatively connected with said feed mechanism, a spring-pressed yoke engaging said movable clutch member and normally tending to hold it in engagement with said fixed member, and mechanism for moving said shaft lengthwise to separate said burs, and said clutch member and simultaneously stop the grinding and feeding operation.

6. In a grinding-mill, the combination, with a frame and hopper, of a revolving feed mechanism provided with a gear 32 having an eccentric 39, a rod 40 adjustably mounted on said hopper and having a forked end to straddle said eccentric, and fingers at its opposite end which project horizontally across the discharge-opening in said hopper, for the purpose specified.

7. In a grinding-mill, the combination, with a frame and hopper, of a feed mechanism, a rod 40 mounted on said hopper and arranged to be oscillated vertically by the movement of said feed mechanism, and said rod having fingers arranged to project horizontally across the discharge-opening in said hopper and prevent the clogging of the material therein during the feeding operation, subtantially as described.

8. In a grinding-mill, the combination, with a frame and hopper provided with a revolving feed mechanism having a gear 32, of a fixed bur, a longitudinally-movable shaft, a bur secured thereon and coöperating with said fixed bur, means for moving said shaft lengthwise to separate said burs, a clutch member 23 secured on said shaft, a movable clutch member 25 movable lengthwise on said shaft and having gear-teeth to engage the teeth of said gear 32, and a spring-pressed yoke engaging said movable clutch member and normally tending to hold it in engagement with said clutch member 23 but allowing them to separate when said shaft is moved lengthwise, substantially as described.

In witness whereof I have hereunto set my hand this 27th day of Februrary, 1905.

CUNNINGHAM N. McLAUGHLIN.

Witnesses:
A. M. BIRMINGHAM,
R. A. DIXON.